(12) United States Patent
Fan

(10) Patent No.: US 11,418,875 B2
(45) Date of Patent: Aug. 16, 2022

(54) END-FIRE ARRAY MICROPHONE ARRANGEMENTS INSIDE A VEHICLE

(71) Applicant: VUI.AI Inc, Santa Clara, CA (US)

(72) Inventor: Dashen Fan, Santa Clara, CA (US)

(73) Assignee: VULAI Inc, Santa Clara, CA (US)

( * ) Notice: Subject to any disclaimer, the term of this patent is extended or adjusted under 35 U.S.C. 154(b) by 57 days.

(21) Appl. No.: 16/601,049

(22) Filed: Oct. 14, 2019

(65) Prior Publication Data

US 2021/0112335 A1    Apr. 15, 2021

(51) Int. Cl.
| | | |
|---|---|---|
| H04R 3/00 | (2006.01) |
| G10L 21/0232 | (2013.01) |
| G10L 15/22 | (2006.01) |
| G10L 25/78 | (2013.01) |
| H04R 1/40 | (2006.01) |
| G10K 11/178 | (2006.01) |
| H04M 1/60 | (2006.01) |
| G10L 21/0208 | (2013.01) |

(52) U.S. Cl.
CPC ....... *H04R 3/005* (2013.01); *G10K 11/17823* (2018.01); *G10K 11/17873* (2018.01); *G10L 15/22* (2013.01); *G10L 21/0232* (2013.01); *G10L 25/78* (2013.01); *H04M 1/6075* (2013.01); *H04R 1/406* (2013.01); *G10K 2210/1282* (2013.01); *G10L 2015/223* (2013.01); *G10L 2021/02082* (2013.01); *H04R 2499/13* (2013.01)

(58) Field of Classification Search
USPC .................. 381/26, 71.1, 71.4, 91, 355, 369
See application file for complete search history.

(56) References Cited

U.S. PATENT DOCUMENTS

| | | |
|---|---|---|
| 7,386,135 B2 | 6/2008 | Fan |
| 8,885,850 B2 | 11/2014 | Fan |
| 9,257,952 B2 | 2/2016 | Fan |
| 9,312,826 B2 | 4/2016 | Fan |
| 9,406,293 B2 | 8/2016 | Fan |
| 9,456,275 B2 | 9/2016 | Fan |

(Continued)

FOREIGN PATENT DOCUMENTS

| | | |
|---|---|---|
| CN | 1568093 A | 1/2005 |
| WO | 2018/129086 A1 | 7/2018 |

OTHER PUBLICATIONS

Amazon—Shure RMCE-USB Earphone Communication Cable with Integrated DAC/Amp for SE y Earphones (Shure)< Downloaded from the Internet https:l/www.amazon.com/Shure-RMCE- USB-Communication-Integrated-Earphones/dp/B07DQ8BLXS > < Downloaded on Feb. 3, 2021 ><Date First Available Jul. 2, 2018 > enitre document, especially: pp. 1.

(Continued)

*Primary Examiner* — Yosef K Laekemariam
(74) *Attorney, Agent, or Firm* — Rimon PC

(57) ABSTRACT

The present application discloses exemplary arrangements of an end-fire microphone array inside a vehicle and exemplary digital signal processors configured for the end-fire in-car microphone array. The exemplary digital signal processors may be configured in two modes, a phone call mode and an automatic speech recognition mode. In each mode, the exemplary digital signal processors are improved for enhanced SNR. Different end-fire microphone array arrangements are also disclosed.

7 Claims, 9 Drawing Sheets

(56) References Cited

U.S. PATENT DOCUMENTS

| | | |
|---|---|---|
| 9,491,544 B2 | 11/2016 | Fan |
| 9,633,670 B2 | 4/2017 | Fan |
| 9,753,311 B2 | 9/2017 | Fan |
| 9,792,927 B2 | 10/2017 | Fan |
| 9,810,925 B2 | 11/2017 | Fan |
| 9,913,302 B2 | 3/2018 | Parkinson et al. |
| 9,941,895 B2 | 4/2018 | Fan et al. |
| 2010/0124339 A1* | 5/2010 | Turnbull ............... H04R 3/005 381/86 |
| 2014/0006027 A1* | 1/2014 | Kim ..................... H04M 1/271 704/246 |
| 2014/0268016 A1 | 9/2014 | Chow et al. |
| 2014/0270316 A1 | 9/2014 | Fan |
| 2015/0006181 A1 | 1/2015 | Fan et al. |
| 2015/0350777 A1* | 12/2015 | Yang ....................... H04R 3/02 381/66 |
| 2016/0112817 A1 | 4/2016 | Fan et al. |
| 2016/0127827 A1 | 5/2016 | Tzirkel-Hancock et al. |
| 2016/0140949 A1 | 5/2016 | Fan et al. |
| 2017/0094407 A1 | 3/2017 | McElveen |
| 2017/0110142 A1 | 4/2017 | Fan et al. |
| 2018/0040334 A1 | 2/2018 | Fan et al. |
| 2018/0045982 A1 | 2/2018 | Fan |

OTHER PUBLICATIONS

International Searching Authority, International Search Report and Written Opinion for International Application No. PCT/US20/55519 dated Mar. 12, 2021.

\* cited by examiner

END-FIRE ARRAY MICROPHONE ARRANGEMENTS INSIDE A VEHICLE

FIELD OF THE INVENTION

The present disclosure relates generally to audio devices and more specifically to optimal arrangements of microphones and improved signal processing inside a vehicle.

BACKGROUND OF THE INVENTION

Nowadays telephones are commonly installed inside a vehicle to allow the driver to initial or receive a phone call without taking hands off the wheel. Such built-in telephones rely on microphones to pick up voice signals in a high-noise background where there are multiple noise sources in a reverberant environment. This imposes high signal over noise ratio enhancement (SNRE) performance requirements on the audio device used in the built-in telephones inside a vehicle.

In some cases, a driver may install their mobile phone on the dash board to make or answer a phone call while keeping hands on the wheel. When the driver initiates a call using voice command, the phone is activated through voice recognition. In this voice recognition mode, the microphone associated with the mobile phone must pick up the voice command amid the noises and the signal processor must separate the voice signal from the background noises. When the driver engages in a phone call without a headset, the microphone associated with the mobile phone must cancel echoes that are inevitably generated in a reverberant environment inside a vehicle. In this phone call mode, the microphone and the signal processor should be configured with noise reduction and echo cancellation functionalities.

Prior art audio systems are not ideally configured to provide an effective hands-free audio application for use inside a vehicle. The present application teaches various embodiments that are especially suitable to use in a relatively noisy and reverberant environment, such as, the interior of a vehicle.

SUMMARY OF THE INVENTION

Accordingly, it is an objective of the present disclosure to teach an audio system that is suitable for use inside a vehicle.

In some embodiments, an exemplary audio system comprises an array of one or more microphones in an end-fire configuration. The microphone array is located on a charging device. The exemplary audio system further comprises a dual-mode digital signal processor configured to operate in an automatic speech recognition mode and a phone call mode. In the exemplary audio system, each of the one or more microphones generates an audio signal as an input to the dual-mode digital signal processor. In some embodiments, the charging device may be a USB charging cable. The microphone array may be located on the head of the US charging cable. For example, the microphone array may be located on the same side of the USB head or both sides of the USB head or a side-edge of the USB head.

In some embodiments of the exemplary audio system, the digital signal processor comprises a beamforming module configured to output two cardioid beams. In one embodiment, the beamforming module is an adaptive noise cancellation (ANC) beamforming module and the ANC beamforming module generates a front-facing main beam and an omni-directional reference beam. In one embodiment, the beamforming module is a voice activity detection (VAD) beamforming module. The VAD beamforming module is configured to generate a front facing beam and a back facing beam.

In some embodiments, the dual-mode digital signal processor comprises an adaptive noise cancellation module for cancelling environmental noise. In some embodiments, the digital signal processor is a dual-mode digital processor that comprises a beamforming module and an adaptive noise cancellation module. The digital signal processor may further comprise a voice activity detection module for speech recognition, an echo cancellation module for cancelling echo noise, and/or a double-talk detector module for detecting voice signals from one or more speakers and for removing or separating the detected voice signals from the total signals collected by the end-fire microphone array.

In some embodiments of the exemplary audio system, the audio system comprises an array of one or more microphones in an end-fire configuration and a dual-mode digital signal processor. The microphone array is located on an edge of a smartphone and is aligned along a line perpendicular to the edge. Each microphone in the microphone array generates an audio signal as an input to the dual-mode digital signal processor. The dual-mode digital signal processor is configured to operate in an automatic speech recognition mode and a phone call mode.

In some embodiments, the dual-mode digital signal processor comprises a beamforming module configured to output two cardioid beams. In one embodiment, the beamforming module generates a front-facing main beam and an omni-directional reference beam for adaptive noise cancellation purposes. In another embodiment, the beamforming module generates a front-facing beam and a back-facing beam for voice activity detection purposes. In some embodiments, the dual-mode digital signal processor comprises an adaptive noise cancellation module for cancelling environmental noises. In some embodiments, the dual-mode digital signal processor comprises an echo cancellation module for cancelling echo. In one embodiment, the dual-mode digital signal processor may comprise a beamforming module, an adaptive noise cancellation module, and/or an echo cancellation module. In some embodiments, the dual-mode digital processor further comprises a double-talk detector module for detecting voice signals from one or more speakers and removing the detected voice signals from the total signals collected by the end-fire microphone array.

In some embodiments, an exemplary audio system comprises an array of four or more microphones. At least two microphones in the microphone array are arranged at one end of a rear-view mirror in an end-fire configuration and at least two microphones in the microphone array are arranged at the other end of a rear-view mirror in an end-fire configuration. The exemplary audio system further comprises a dual-mode digital signal processor configured to operate in an automatic speech recognition mode and a phone call mode. In the exemplary audio system, each of the one or more microphones generates an audio signal as an input to the dual-mode digital signal processor. The dual-mode digital signal processor comprises a beamforming module configured to output a front-facing main beam and an omni-directional reference beam. In some embodiments, the dual-mode audio processor further comprises an adaptive noise cancellation module for cancelling environmental noise. The dual-mode audio processor may further comprise a voice activity detection module for speech recognition, an echo cancellation module for cancelling echo, and/or a double-talk detector module for detecting voice signals from one or more speakers and removing the detected voice signals from the total signals collected by the end-fire microphone array.

In some embodiments, an exemplary audio system comprises an array of one or more microphones in an end-fire configuration and a dual-mode digital signal processor. The microphone array is located on an accessary device installed inside a vehicle and is arranged in a forward-facing direction of driver of the vehicle. Each microphone in the microphone array generates an audio signal as an input to the dual-mode digital signal processor. The accessory device can be a phone holder, a dashboard camera, etc.

BRIEF DESCRIPTION OF THE DRAWINGS

These and other features of the present disclosure will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

DETAILED DESCRIPTION

Embodiments of the disclosure are described more fully hereinafter with reference to the accompanying drawings, in which preferred embodiments of the disclosure are shown. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Figure 1A:
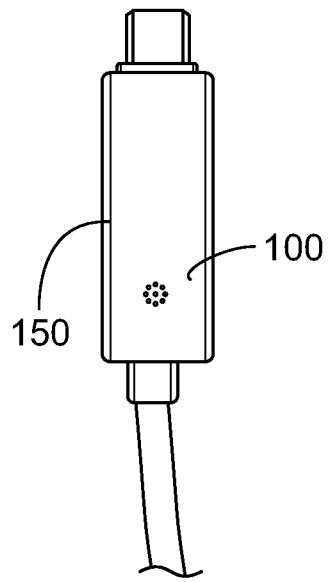
FIGS. 1A-1C show a first exemplary embodiment of an end-fire array of microphones for use inside a vehicle.
Figure 1B:
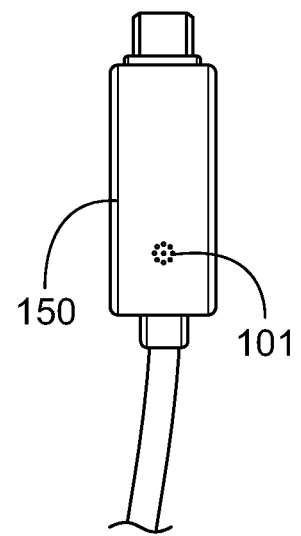
Figure 1C:
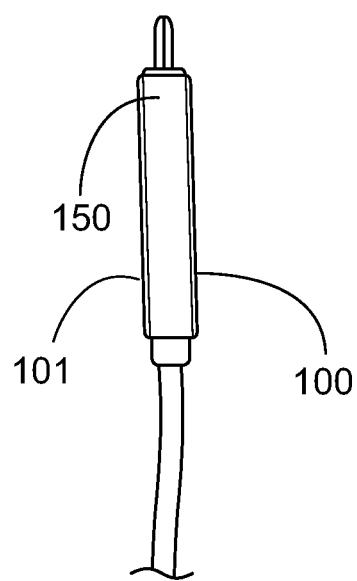

In referring to FIGS. 1A-1C, an exemplary configuration of an end-fire microphone array 100 is illustrated. As an example, the microphone arrays 100 in FIGS. 1A-1C are shown to comprise two microphones. In some embodiments, the microphone array can include more than two microphones. In certain configurations, the microphone array may include just one microphone. In FIGS. 1A-1C, the two microphones, 100 and 101, are located, respectively, on the front and back side of the head 150 of a charging cable, for example, a USB charging cable. FIG. 1A shows the front side of the cable head 150 with the microphone 100. FIG. 1B shows the back side of the cable head 150 with the microphone 101 aligned with the microphone 100. FIG. 1C shows a side view of the cable head 150.

Figure 2:
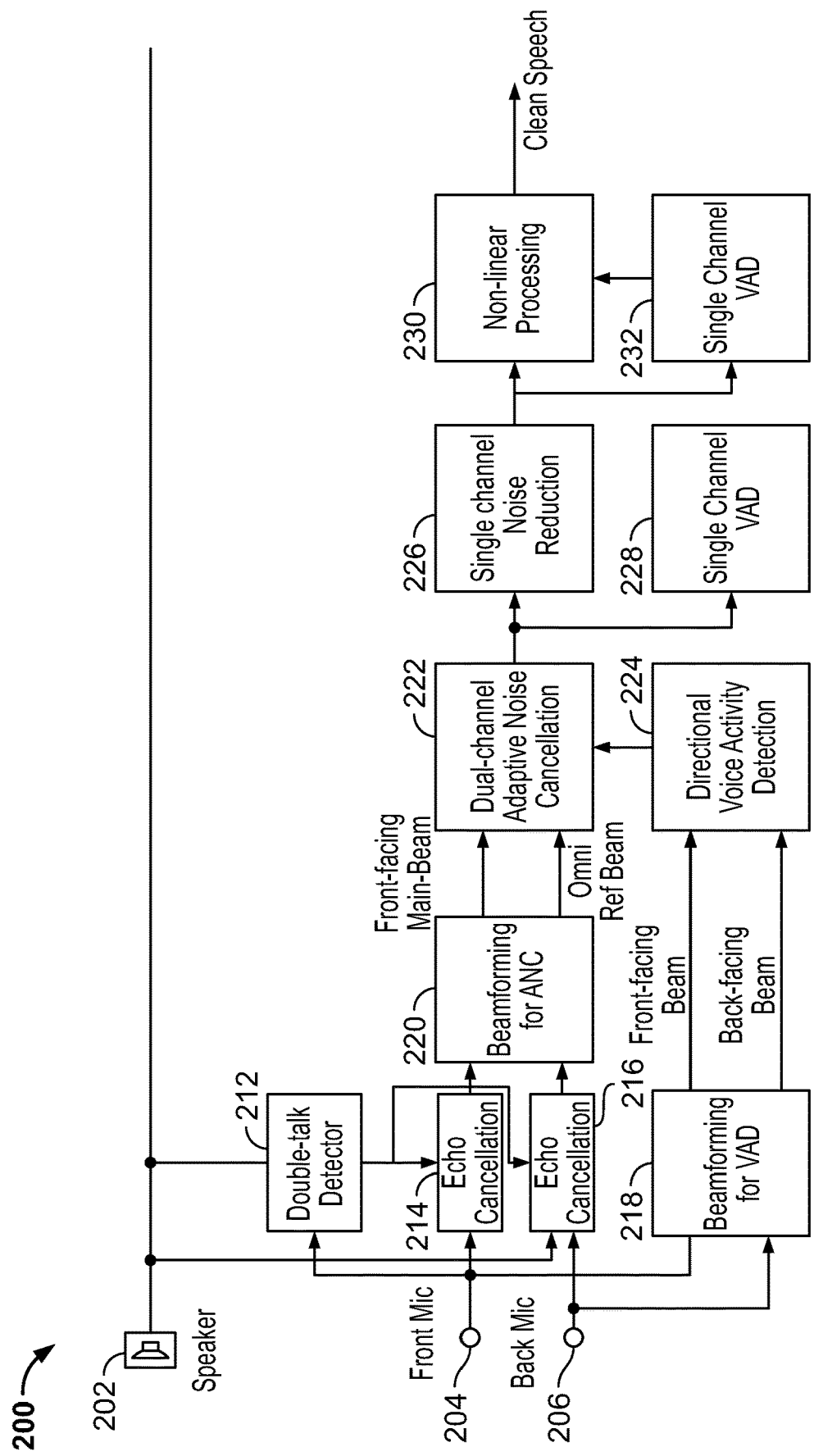
FIG. 2 is a first exemplary embodiment of a digital signal processor for an end-fire in-car microphone array.
Figure 3:
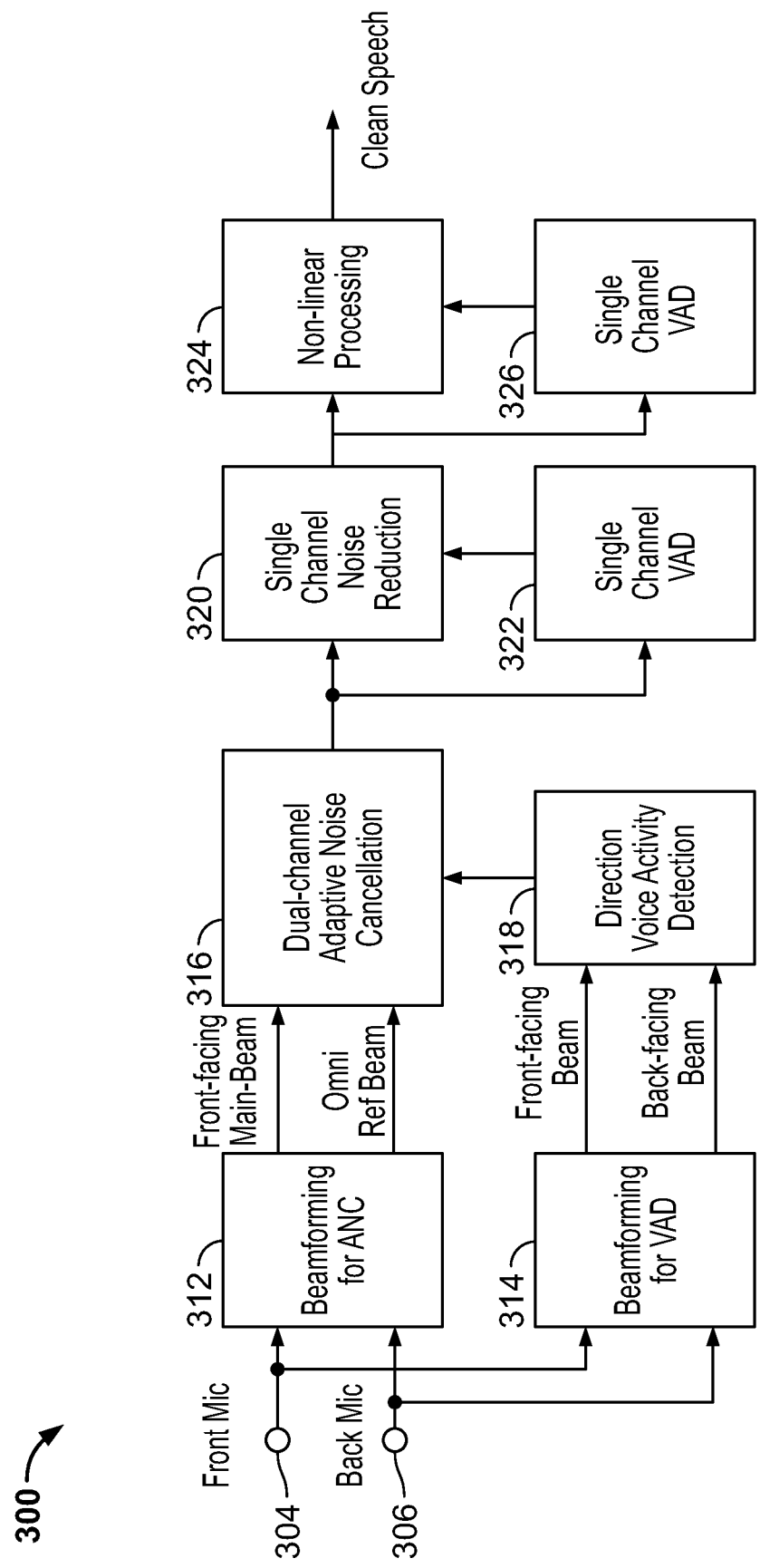
FIG. 3 is a second exemplary embodiment of a digital signal processor for an end-fire in-car microphone array.

When the charging cable is plugged into a mobile phone operating in a vehicle, the microphone array 100 along with its associated digital signal processor provides enhanced audio processing functionalities to the mobile phone. FIG. 2 and FIG. 3 illustrate two exemplary configurations of a digital signal processor (DSP).

In FIG. 2, the digital signal processor 200 is configured to provide optimal audio processing functionalities when the microphone array 100 is in a phone call mode. When in a phone call mode, the microphones, 204 and 206, pick up the voice signals from the speaker 202 and the echo of the voice signals of the speaker 202, in addition to the voice signals from the human being engaged in the phone call. The voice signals from the speaker 202 and the echo generated from those voice signals are environmental noises and should be removed from the voice signals collected from the human being. In a reverberant environment such as the interior of a car, the voice signals from the speaker 202 and the echo become significant noise and should be removed from the true voice signals.

In FIG. 2, the digital signal processor 200 includes a plurality of modules 212-232. The double talk detector module 212 is configured to sample audio signals that is fed into the speaker 202 and is contemporaneous with the voice signals collected by the microphones, 204 and 206, i.e., the so-called double-talk signals. When double talking is detected, the double talk detector module 212 activates the echo cancellation module 214 and 216. The echo cancellation modules 214 and 216 are configured to subtract the audio signals of the speaker 202 from the microphone signals. By doing so, the audio signals broadcasted from the speaker 202 and the echo of such audio signals, both collected by the microphones 204 and 206 as environment noises, are cancelled from the microphone signals, resulting in a clean signal that includes substantially the voice signal of the human being engaged in the phone call.

In the embodiment shown in FIG. 2, the digital signal processor 200 also includes two beamforming modules: the beamforming module for active noise cancelling (ANC) 220 and the beamforming module for voice activity detection (VAD) 218. The ANC beamforming module 220 generates a front facing main beam and a omni reference beam that both are fed into the noise cancellation module 222. The VAD beamforming module 218 generates a front facing beam and a back-facing beam, both of which are fed into the VAD module 224. Illustration of the different beams can be found in FIGS. 4 and 5. The signal output by the VAD module 224 is also input into the noise cancellation module 222, which is configured to produce speech signal based on the input signals from the ANC beamforming module 220 and the VAD module 224.

For better quality, additional modules can be added after the noise cancellation module 222. For example, as shown in FIG. 2, the noise cancellation module 222 is a dual-channel adaptive noise cancellation module 222 and a single channel noise reduction module 226 may be added to reduce the noise level further. A non-linear processing module 230 that further improves the audio signal can also added in some embodiments. Both the single channel noise reduction module 226 and the non-linear processing module 230 take input signals from a single channel VAD module 228 and 232 respectively to generate a clean speech signal.

FIG. 3 illustrates an exemplary digital signal processor 300 for processing audio signals when in an automatic speech recognition (ASR) mode. In the ASR mode, the digital signal processor 300 is configured to detect a voice command when there is not an active phone call. In such case, there is no voice signal being fed into the speaker and it is not necessary to perform echo cancellation. In the digital signal processor 300, the signals collected by the two microphones, the front microphone 304 and the back microphone 306, are fed into the ANC beamforming module 312 and the VAD beamforming module 314. The ANC beamforming module 312 generates a front-facing main beam and an omni reference beam. Both beams are input into a dual-channel adaptive noise cancellation module 316, after which a single channel noise reduction module 320 and a non-linear processing module 324, both coupled with a single channel VAD module, 322 and 326 respectively, are employed to produce a clean speech signal. The VAD beamforming module 314 generates a front-facing beam and a back-facing beam that are fed into a directional voice activity detection module 318. The output from the directional voice activity detection module 318 indicates the direction of the voice activity and is input into the dual channel adaptive noise cancellation module 316.

Figure 4:
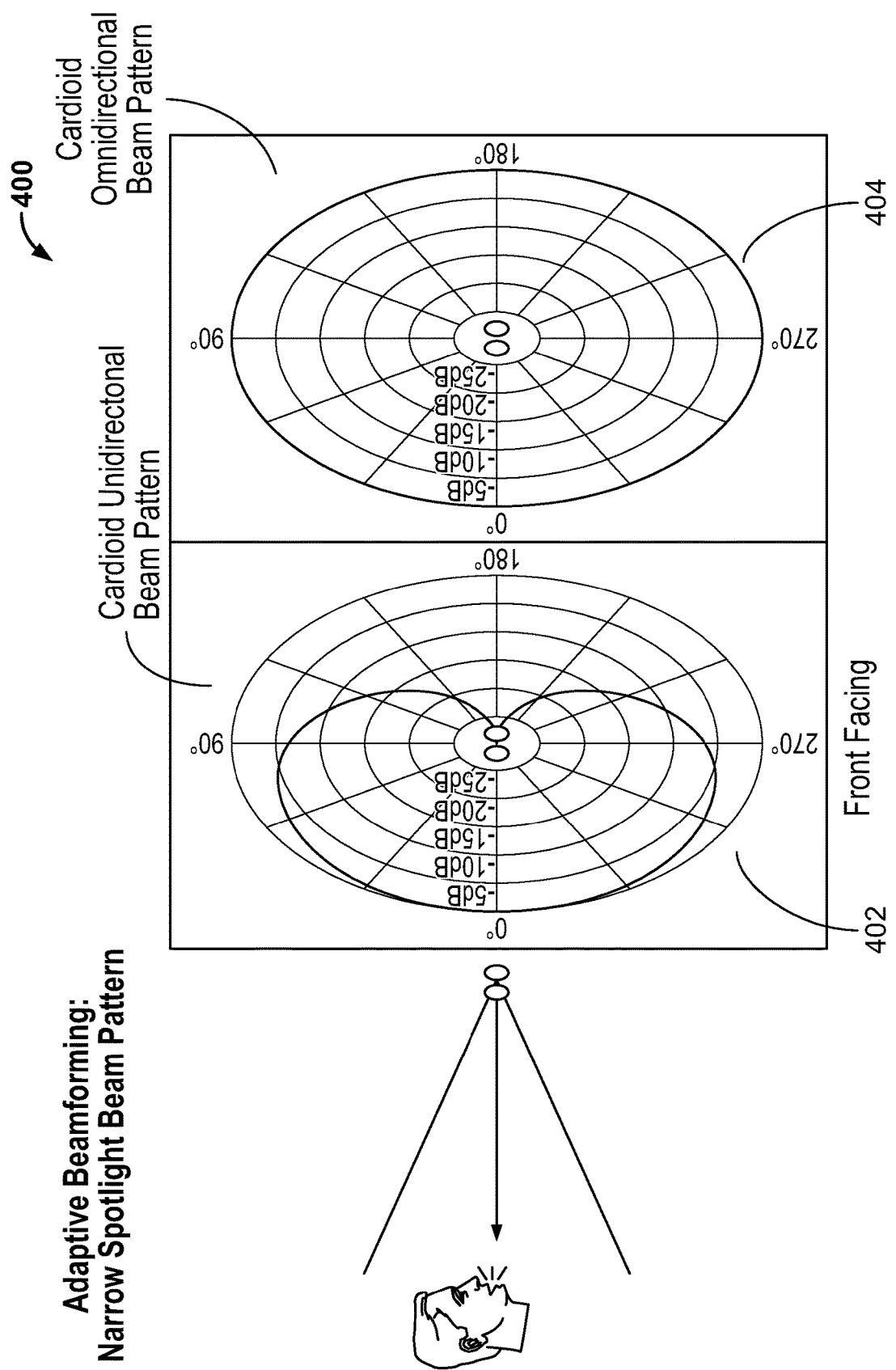
FIG. 4 is an illustration of beamforming patterns when an end-fire in-car microphone array is in a phone call mode.
Figure 5:
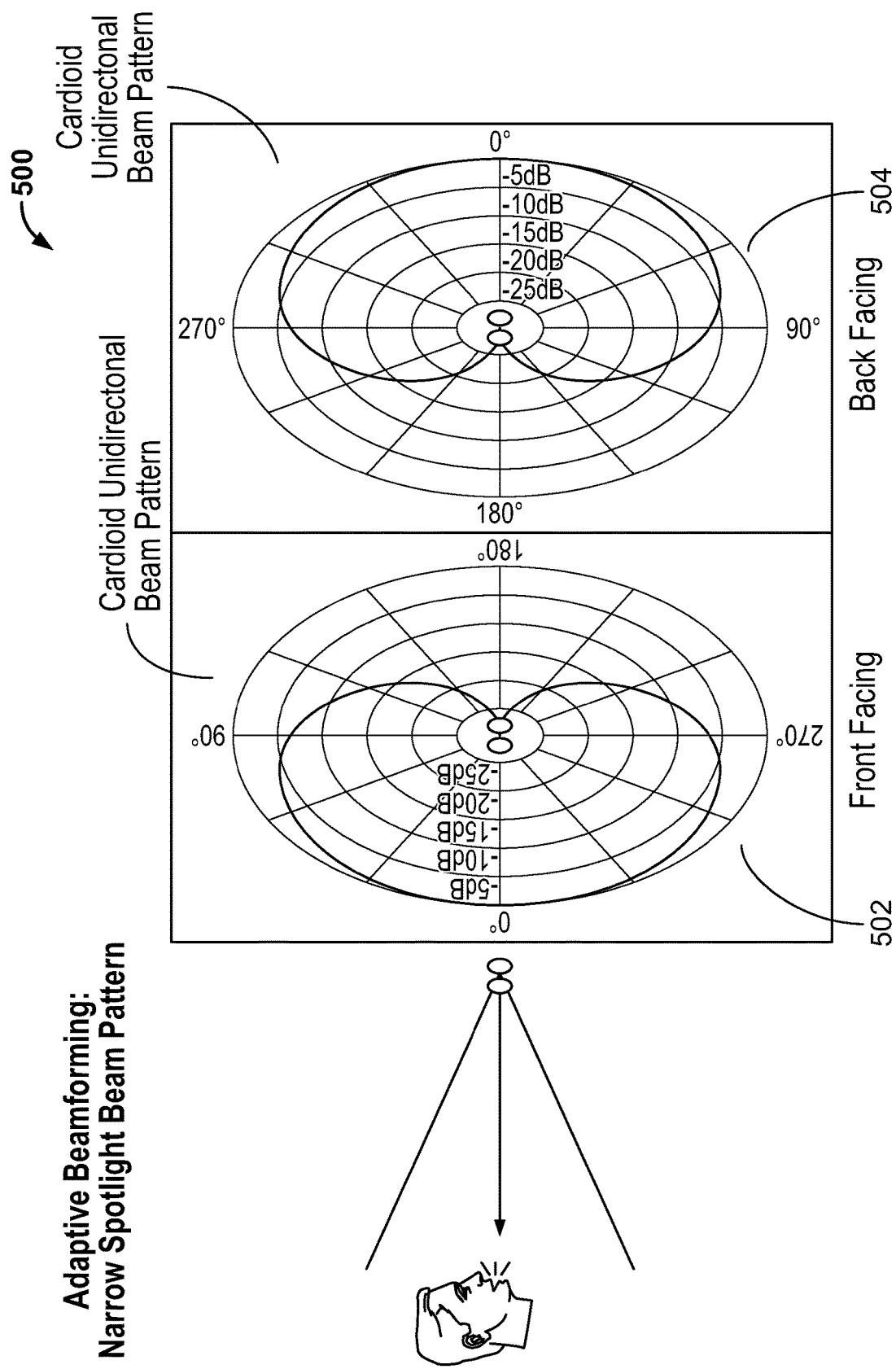
FIG. 5 is an illustration of beamforming patterns when an end-fire in-car microphone array is in an automatic speech recognition mode.

FIG. 4 and FIG. 5. illustrate the beam forming mechanism used in the ANC beamforming module and the VAD beamforming module. In FIG. 4, the two beams, 402 and 404, generated by the ANC beamforming module 312 are shown. The beam 402 is a front facing cardioid beam, which has a null in the back-facing direction and a maximum facing forward. The beam 402 comprises both desired voice signal and noise. It is the main beam. The second beam, 404, is an omni beam that is substantially devoid of voice signal. The beam 404 is a reference beam that represents the background noises and is used to cancel the noises in the main beam 402. Both beams, 402, and 404, are fed into the noise cancellation module 316 for noise reduction and cancellation.

In FIG. 5, the VAD beamforming module 314 generates a front facing cardioid beam 502 and a back facing cardioid beam 504. The front facing cardioid beam 502 comprises a maximum at the front side of the beam and a null at the back side of the beam. The back facing cardioid beam 504 comprises a null at the front side of the beam and a maximum at the back side of the beam. Both beams, 502 and 504, are fed into the directional voice activity detection module 318 for processing. As a skilled person in the art would know, the directional voice activity detection module 318 may comprises various signal processing components such as converters, filters, delay elements, adder, comparator, etc. In some embodiments, the directional voice activity detection module 318 is configured to generate a narrow spotlight beam pattern that is indicative of the direction of the voice activity.

In the above description, a microphone array of two microphones is used as an example for illustration purposes. However, the embodiments are not so limited. In alternate embodiments, two or more microphones can be used to generate beams. Generally, the microphones in a microphone array are disposed proximally adjacent to each other. For certain applications that involve human interface, the separating distance between two adjacent microphones may be in the range as small as 0.2 cm to 1cm. Other applications, e.g., semiconductor acoustic devices, the separating distance may be in the order of microns or sub-microns. While the distance of two adjacent microphones is constraint by the likelihood of cross interference between the elements, their relative positions, e.g., whether the microphones face the expected originating direction of a desired voice signal in parallel or in series, are not as important as their respective beam patterns.

In the above description, the term "microphone" is used in describing various embodiments. It is noted that the principles and the theories disclosed herein are applicable to embodiments in which different types of acoustic devices other than microphones may be used in place of microphones.

FIGS. 6-9 illustrates four more exemplary arrangements of an array of acoustic devices or microphones.

Figure 6:
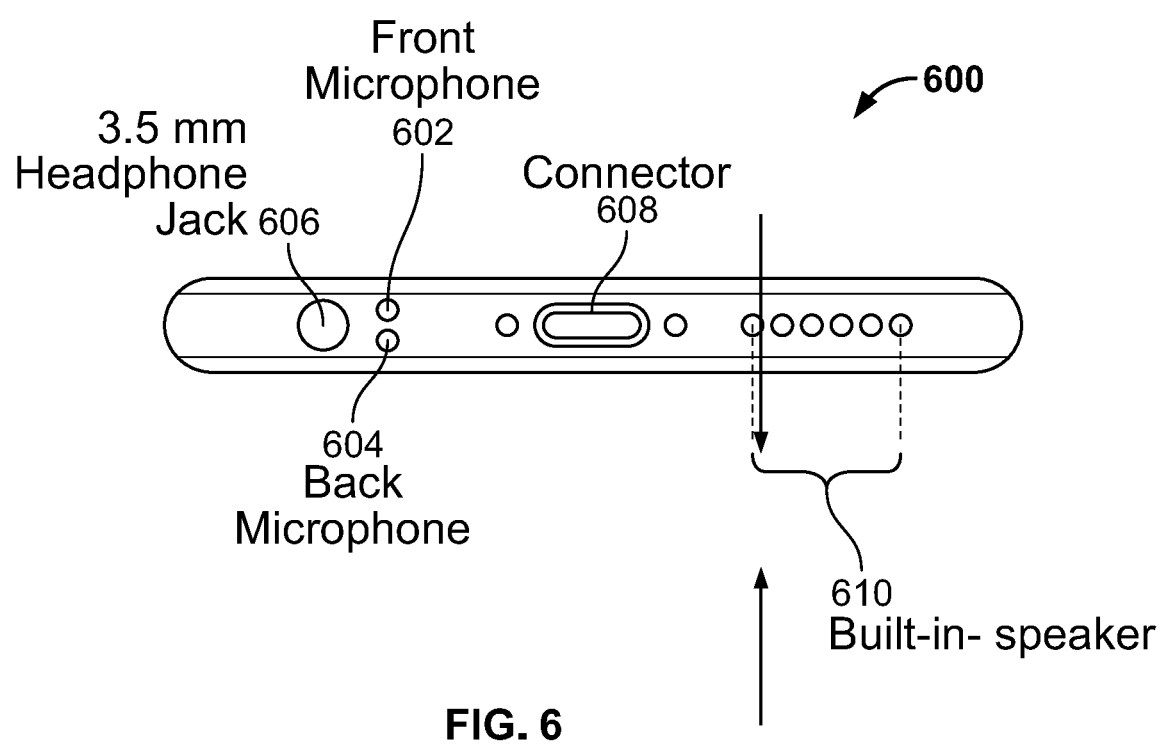
FIG. 6 illustrates a second exemplary arrangement of an end-fire in-car microphone array.

FIG. 6 shows a bottom edge of a smart phone 600. On the bottom edge of the smart phone are a 3.5 mm headphone jack 606, a cable connector 608, e.g., USB cable, and an array of built-in speakers 610. An array of microphones comprising a front microphone 602 (close to the front side of the smart phone) and a back microphone 604 (close to the back side of the smart phone) are disposed on the bottom edge of the smart phone in between the headphone jack 606 and the cable connector 608. The microphones 602 and 604 face the expected originating direction, i.e., the user who is speaking into the front side of the smart phone, in series.

Figure 7:
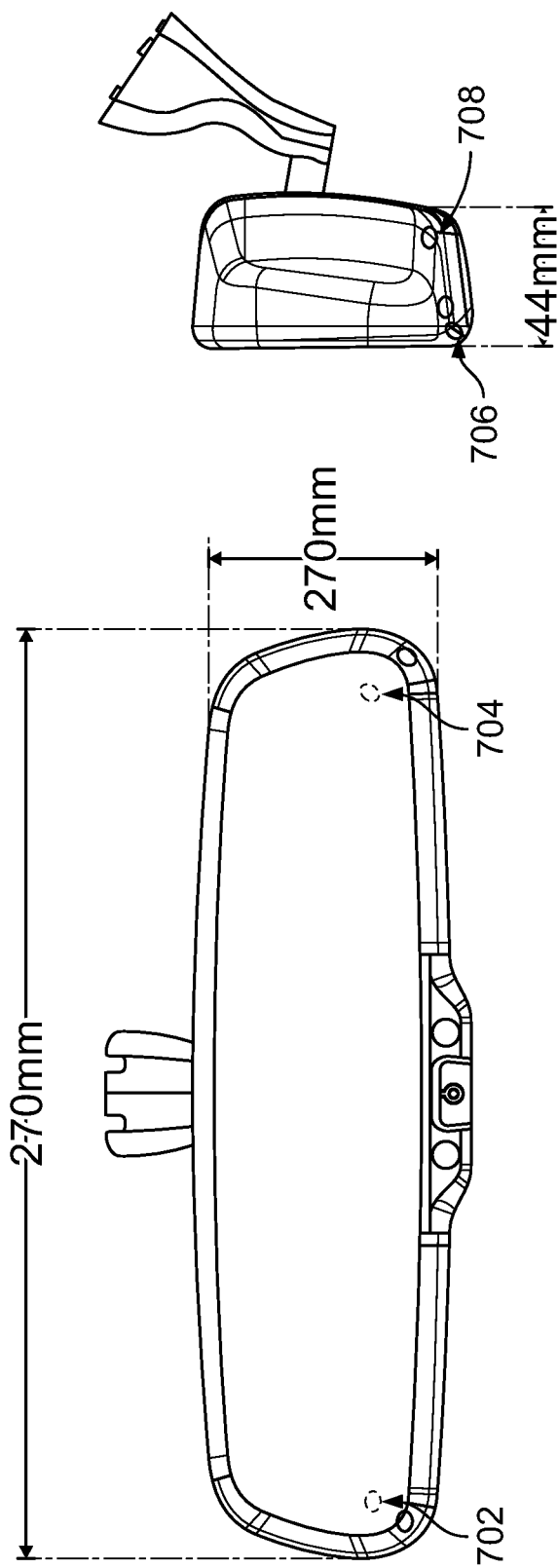
FIG. 7 illustrates a third exemplary arrangement of an end-fire in-car microphone array.

In FIG. 7, a rearview mirror 700 used inside a vehicle is shown as comprising two microphone arrays. Each microphone array, 702 or 704, comprises two microphones, 706 and 708, and disposed on one end of and at the lower edge of the rearview mirror 700. The microphones 706 and 708 face the expected originating direction, a driver sitting in front of the rearview mirror 700, in parallel.

Figure 8:
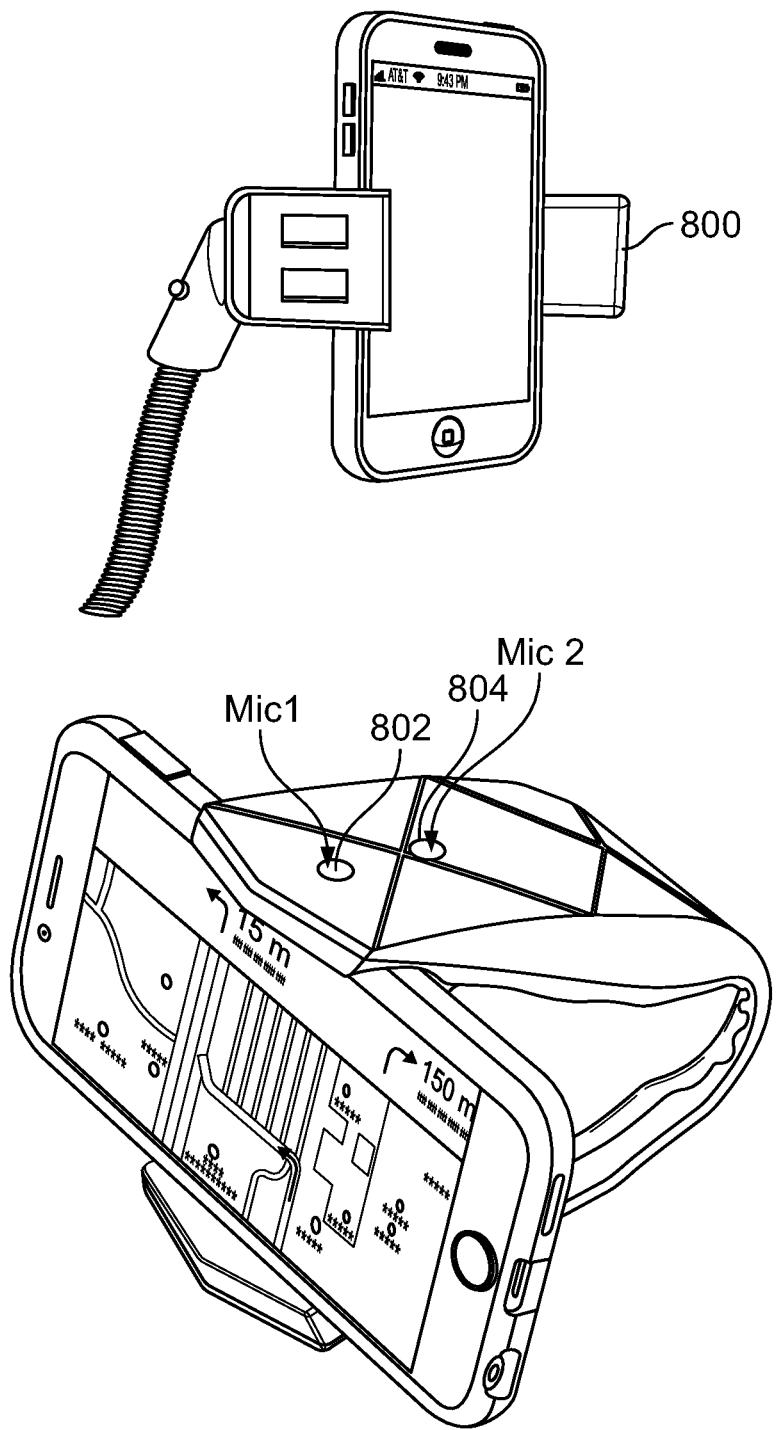
FIG. 8 illustrates a fourth exemplary arrangement of an end-fire in-car microphone array.

In FIG. 8, a phone holder 800 is shown as holding a smartphone. The phone holder 800 can be used inside a vehicle to allow the driver to make or receive phone calls hands-free. In this embodiment, the microphones 802 and 804 are disposed on the phone holder, not on the smartphone. The microphones 802 and 804 are arranged to face the expected originating direction, i.e., the driver facing the front face of the smartphone, in series.

Figure 9:
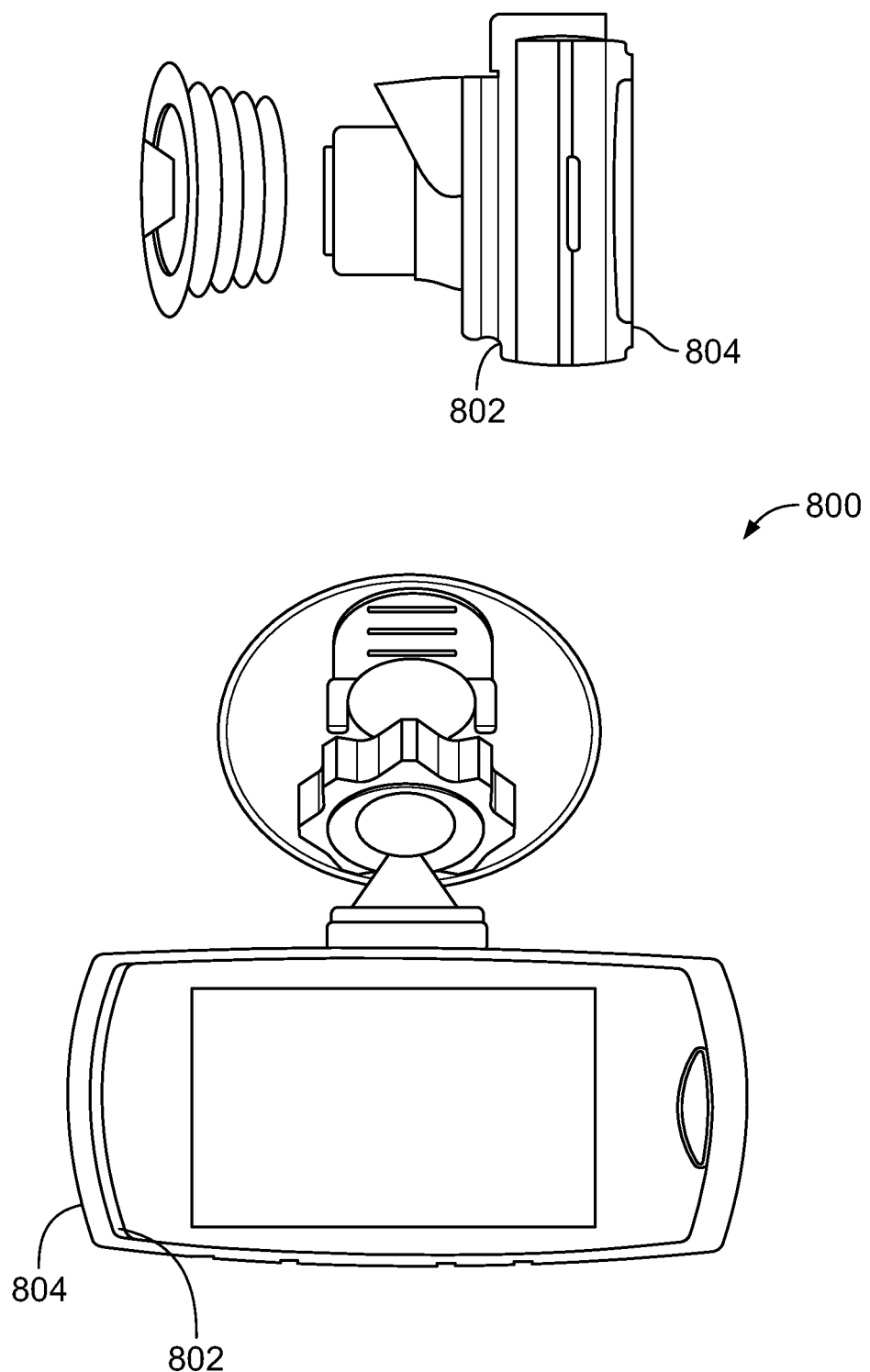
FIG. 9 illustrates a fifth exemplary arrangement of an end-fire in-car microphone array.

FIG. 9 illustrates a microphone array 800 arranged on a dashboard camera installed inside a car, e.g., on the dashboard or windshield. The dashboard camera is in front of the driver of the car. The microphone array 800 comprises two microphones, 802 and 804. The microphone array 800 is placed at the lower left corner of the dashboard camera and the microphones, 802 and 804, are arranged to face the expected originating direction, i.e., the driver facing the dashboard, in series. In some embodiments, there may be two microphone arrays, one on each lower corner of the dashboard camera.

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. An audio system, comprising:
    an array of one or more microphones in an end-fire configuration, wherein the microphone array is located on an edge of a smartphone and wherein the microphone array is aligned along a line perpendicular to the edge; and
    one or more speakers; and
    a dual-mode digital signal processor, including an echo cancellation module and configured to operate in an automatic speech recognition mode and a phone call mode;
    wherein each of the one or more microphones generates an audio signal as an input to the dual-mode digital signal processor; and
    wherein the dual-mode digital signal processor detects whether the audio system is in the automatic speech recognition mode or the phone call mode and activates the echo cancellation module if the audio system is not in the automatic speech recognition mode.

2. The audio system of claim 1, wherein the dual-mode digital signal processor comprises a beamforming module, and wherein the beamforming module is configured to output two cardioid beams.

3. The audio system of claim 2, wherein one of the two cardioid beams is a front facing main beam and one of the two cardioid beams is an omni reference beam.

4. The audio system of claim 2, wherein one of the two cardioid beams is a front facing main beam and one of the two cardioid beams is a back facing beam.

5. The audio system of claim 1, wherein the dual-mode audio processor further comprises an adaptive noise cancellation module for cancelling environmental noise.

6. The audio system of claim 1, wherein the dual-mode audio processor further comprises a voice activity detection module for speech recognition.

7. The audio system of claim 1, wherein the dual-mode audio processor comprises a double-talk detector module for detecting voice signals from one or more speakers and removing the detected voice signals from voice signals collected by the end-fire microphone array.

\* \* \* \* \*